United States Patent
Ban et al.

(10) Patent No.: US 9,848,613 B2
(45) Date of Patent: Dec. 26, 2017

(54) INGREDIENTS FOR DELAYING MILK FAT OXIDATION

(71) Applicant: Kemin Industries, Inc., Des Moines, IA (US)

(72) Inventors: Lan Ban, West Des Moines, IA (US); William Schroeder, Ames, IA (US)

(73) Assignee: KEMIN INDUSTRIES, INC., Des Moines, IA (US)

( * ) Notice: Subject to any disclaimer, the term of this patent is extended or adjusted under 35 U.S.C. 154(b) by 0 days.

(21) Appl. No.: 14/744,567

(22) Filed: Jun. 19, 2015

(65) Prior Publication Data

US 2016/0015048 A1 Jan. 21, 2016

Related U.S. Application Data

(60) Provisional application No. 62/014,528, filed on Jun. 19, 2014.

(51) Int. Cl.
*A23C 3/08* (2006.01)
*A23C 9/16* (2006.01)
*A23C 1/01* (2006.01)

(52) U.S. Cl.
CPC .......... *A23C 3/08* (2013.01); *A23C 1/01* (2013.01); *A23C 9/16* (2013.01)

(58) Field of Classification Search
CPC .............. A23C 9/16; A23C 3/08; A23C 1/01
See application file for complete search history.

(56) References Cited

U.S. PATENT DOCUMENTS

| | | | |
|---|---|---|---|
| 6,524,610 B2 * | 2/2003 | Muszynska | A23L 33/16 424/400 |
| 2009/0214712 A1* | 8/2009 | Kang | A23C 9/1516 426/73 |
| 2010/0129324 A1* | 5/2010 | Crespy | A23L 1/28 424/93.4 |
| 2010/0137433 A1* | 6/2010 | Kott | A61K 36/534 514/532 |
| 2010/0297266 A1* | 11/2010 | Buchwald-Werner | A23C 9/13 424/725 |
| 2012/0046369 A1* | 2/2012 | Nahas | A23C 9/1526 514/773 |

FOREIGN PATENT DOCUMENTS

| WO | 2012007818 | 1/2012 |
|---|---|---|
| WO | 2012021163 | 2/2012 |

OTHER PUBLICATIONS

M. F. El-Din et al. J. Amer. Sci. 2010, 6(10): 570-579.*
Santos et al. Semina: Ciências Agrárias, Londrina, v. 33, n. 2, p. 655-666, 2012.*
Cuppett in Antioxidants in food, Ed. Pokorny et al. Woodhead Publishing Ltd. CRC Press, 2001, Chapter 12, pp. 285-310.*
Hand et al. J. Dairy Sci., vol. XXII, No. 10, Oct. 1939, pp. 779-783.*
S. C. Murphy et al. "Light-Induced Flavor Defects in Milk", Dairy Foods Science Notes, Cornell University, Sep. 2007, 1 page.*
Erkan et al. Food Chemistry 110 (2008) 76-82.*
Abbot, J, "Ascorbyl Palmitate as an antioxidant in full-cream milk powder", "XVIII International Dairy Congress", Jan. 1, 1970, pp. 464.
F.D. Gunstone, "Chemical Properties, Catalytic Hydrogenation, Chemical Reduction, Biohydrogenation", , pp. 449-489.
Smet et al., "A change in antioxidative capacity as a measure of onset to oxidation in pasteurized milk", "International Diary Journal", Jan. 1, 2008, pp. 520-530, vol. 18, Publisher: Elsevier.
Cluskey et al, "Cholesterol Oxidation Products in Whole Milk Powder: Analytical, nutritional, processing and toxicological studies.", Jan. 1, 1997.
Hedegaard et al., "Comparison of Descriptive Sensory Analysis and Chemical Analysis for Oxidative Changes in Milk", "J. Dairy Sci", Jan. 1, 2006, pp. 495-504, vol. 89, Publisher: American Dairy Science Association.
Abbot et al., "The effect of antioxidants on the keeping quality of whole milk powder", "The Hannah Dairy Research Institute, Ayr", Jan. 1, 1962, pp. 55-61, vol. 29, Publisher: J. Dairy Res., Published in: UK.
J. Abbot, "The Effect of Antioxidants of Spray-Dried Whole Milk Powder", "Journal of the society of dairy technology", Oct. 1, 1971, pp. 182-183, vol. 24, No. 4.
Huth et al., "Influence of Dairy Product and Milk Fat Consumption on Cardiovascular Disease Risk: A Review of the Evidence", Jan. 1, 2012, pp. 266-285, vol. 3, Publisher: American Society for Nutrition. Adv. Nutr.
Cluskey et al., "Lipid and Cholesterol Oxidation in Whole Milk Powder during Processing and Storage", "Journal of Food Science", Jan. 1, 1997, pp. 331-337, vol. 62, No. 2.
"Milk Powders", "Think USA Dairy", , Publisher: U.S.Dairy Export Council.
Nalur et al., "Rapid, sensitive, iron-based spectrophotometric methods for determination of peroxide values of food lipids.", "Journal of AOAC International", Feb. 1, 1994, pp. 421-424, vol. 77, No. 2.
Granda-Restrepo, Diana et al., "Release of antioxidants from co-extruded active packaging developed for whole milk powder", "International Dairy Journal", Jan. 1, 2009, pp. 481-488, vol. 19, Publisher: Elsevier.
Yoon et al., "Singlet Oxygen and Ascorbic Acid Effects on Dimethyl Disulfide and Off-Flavor in Skim Milk Exposed to Light", "Chemistry/Biochemistry", Jan. 1, 1998, pp. 408-412, vol. 63, No. 3, Publisher: Journal of Food Science.

(Continued)

*Primary Examiner* — Chhaya Sayala

(74) *Attorney, Agent, or Firm* — Nyemaster Goode P.C.

(57) ABSTRACT

A method of protecting a dairy product, including fresh milk and milk powder from oxidation by adding an efficacious amount of a composition including rosmarinic acid.

4 Claims, 8 Drawing Sheets

(56) References Cited

OTHER PUBLICATIONS

Cottone, Elyse, "Use of Natural Antioxidants in Dairy and Meat Products: A Review of Sensory and Instrumental Analyses", "Department of Human Nutrition", Jan. 1, 2006, Publisher: Kansas State University.

* cited by examiner

INGREDIENTS FOR DELAYING MILK FAT OXIDATION

This application claims priority to U.S. Patent Application Ser. No. 62/014,528, filed Jun. 19, 2014, which is incorporated herein in its entirety by this reference.

BACKGROUND OF THE INVENTION

The present invention relates generally to the preservation of dairy products from spoilage and, more specifically, to the use of natural plant extracts to delay oxidation and extend the shelf life of milk and milk powder.

Milk is a complex biological system consisting of fats, proteins, minerals, vitamins, carbohydrates and water. Milk powders contribute nutritionally, functionally and economically to a variety of food formulations including bakery, confectionery, dairy, recombined milk, meat, nutritional beverages and prepared foods. Whole fat milk powder has relative high fat content (26%-40%) and enriched in vitamins, that not only serves as ingredients in processed foods, but also is popular nutrient source in many third world countries[1]. Recently, whole milk fat has found to be a healthy form of fat which could promote human health[2], so it is expected that the consumption of whole fat milk would increase. However, the relatively high fat content makes is prone to oxidation, which can in turn decrease the nutrition value of milk fat, as well as affecting the flavors of milk. On the other hand, in many third world countries, proper packages and controlled storage conditions are limited, which in turn further limit the shelf life of whole fat milk powder. Effective ingredients are needed in whole fat milk powder to slow down oxidation and protect the nutritional and functional values. Synthetic antioxidant, butylrated hydroxyanisole (BHA), is allowed in whole fat milk powder in EU and US However, the general trend to move away from using synthetic ingredient drives this study and many other efforts to identify more natural ingredients, or active packages[3] to delay milk fat oxidation. The objective of this study is to identify multiple natural plant extracts or naturally derived reagents effective to delay milk fat oxidation to replace synthetic chemicals that are currently used in whole fat milk powder.

SUMMARY OF THE INVENTION

The present invention is a method of protecting dairy products against lipid oxidation. An efficacious amount of rosmarinic acid has been found to protect such products better than the synthetic antioxidant BHA that is in common use. Compositions including rosmarinic acid can protect fresh milk and milk powder against oxidation, thereby extending the shelf life of the products without the use of expensive special packaging or synthetic antioxidants. Rosmarinic acid is water-soluble and can be directly added to fresh milk or other aqueous dairy products. For the protection of powder products, rosmarinic acid containing composition could be added in the liquid milk before it is dried into the powder, to protect the dry powder product from oxidation from the early stage for maximum efficacy.

DESCRIPTION OF THE INVENTION

Figure 1:
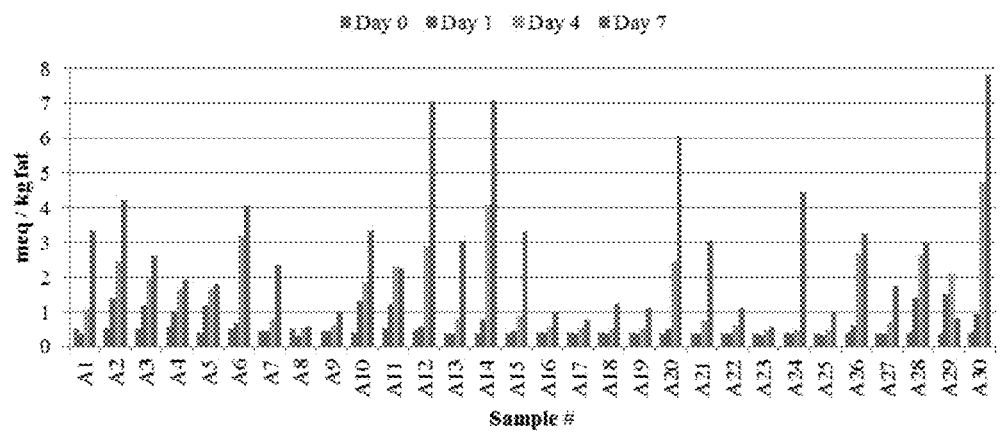
FIG. 1 is a chart of peroxide values in liquid whole fat milk; the sample # corresponds to the number in Table 1.

Plants of the Lamiaceae family are known to produce rosmarinic acid. In particular, mints and especially spearmint (*Mentha spicata*) produce high amounts of rosmarinic acid which can be extracted via a straight-forward water extraction. The water extract may be dried to produce a dry, water soluble product with a high concentration, 5% and higher by weight, of rosmarinic acid.

Milk powder is a widely used ingredient, ranging from a way to supply milk (reconstituted) to different regions of the world, as a nutrition source in ready to eat meals for impoverished countries, to an important ingredient in dairy beverages, energy bars, and infant formula. However, it is prone to oxidation during storage, as an ingredient itself and also in the final application. This study investigated different ingredient treatments to delay milk fat oxidation in whole fat milk powder. In order to evaluate a large number of potential candidates and dosages, an economical and convenient liquid milk model system was developed which could screen large numbers of treatments and give indications of effective treatments within a week. With this model, a few ingredient combinations were able to be picked among 29 treatments and were evaluated in spray dried milk powder. The results have shown that those treatments were very effective in delaying milk powder oxidation comparing to untreated negative control and tocopherols positive control. In addition, through a second screening in liquid milk, spearmint extract was confirmed to be the major active ingredient for delaying milk oxidation and the performance was better than widely used synthetic antioxidant BHA at dosages which were still lower than the sensory threshold. Further trials will be conducted to refine these findings and it is likely that spearmint extract could be used as a natural ingredient alone or in combination with other ingredients in whole fat milk powder to replace some or all of the BHA.

Example 1

Methods and Methods

Materials and Reagents.

Whole fat milk (Anderson Erickson Dairy) was purchased from local grocery store. Thiobarbituric acid was purchased from MP Biochemicals (Cat #190284). Rosmarnic acid (RA, Cat #536954-5G) was purchased from Sigma-Aldrich. Sodium polyphosphate (Cat#390932500) was obtained from Acros. Trichloroacetic acid (TCA, Cat# A322-100) was obtained from Fisher Scientific. Propyl gallate (PG, RM01087, Lot#1303102739), ROSAN™ SF35 (M015425, Lot#1309100569; Kemin Industries, Inc.), FORTIUM® MT95 (RM 15515, Lot#1307109107; Kemin Industries, Inc.), Spearmint extract (SE, 13.4% rosmarinic acid, RM016822, Lot#1302104439; Kemin Industries, Inc.), Ascorbyl palmitate (AP, RM16700, Lot# AAS012G004), Citric acid (CA, in the form of EN-HANCE® CA, Lot#1307108502; Kemin Industries, Inc.), BHA (RM01013, Lot# B1311000063C) were used in this study. Isopropanol (IPA, HPLC grade) was purchased from J.T. Baker (Cat#9095-03). An experimental version of FORTRA™ PG 103 Liquid (4.2% rosmarinic acid, Lot#20140218-01) was made wherein a water extract of spearmint was dried and mixed with the proper amount of propylene glycol to target the rosmarinic acid content to be 4.2%. The mixture was homogenized using an ultrasonic cleaner (Kendall, Model HB36) for 30 min or longer until all the solids dissolved in the solution. Verdilox GT Liquid (Item#016989, Lot #1303106145) is from Kemin Industries, Inc.

Measurement of Peroxide Value (PV) and Thiobarbituric Acid Reactive Substances (TBARs).

PV was measured by a well-accepted method which was designed specifically for whole fat milk or whole fat milk powder[5]. Briefly, in a 10 mL volumetric flask, 4 mL BDI solution (50 g sodium polyphosphate, 50 g urea, 24 mL Triton-X100 and 100 mL IPA. Add water to 1 L) and 6 mL milk sample were mixed. The flask was immersed in a water bath at 80° C. for 20 min. A fat column developed on the top of the aqueous layer. The fat was used as the sample for PV determination following established KFT method[6]. TBARs value was determined using established method in literature[5]. Briefly, 2.0 mL milk sample was mixed in a 15 mL conical tube (Thermo Scientific, Cat#362694) with 114 µL TCA solution (1 g/mL solution in water) and 228 µL 95% ethanol. Cap the tube and vortex for 1 min. Let the tube sit for 5 min. Centrifuge the tube at 4000 rpm for 5 min in a swing bucket table top centrifuge (Thermal Scientific, Sorvall ST16). Take 1.00 mL supernatant out by a pipette and mix with 0.25 mL TBAR solution (14 mg/mL in 95% ethanol, made fresh). Immerse the mixture in a water bath at 60° C. for 60 min. The solution is allowed to cool down to room temperature (about 30 min) and determine the absorbance of the solution at 532 nm using UV-Visible spectrometer (Perkin-Elmer, Model # Lambda25) using distilled water as blank.

Sensory Evaluation of Milk Powder.

The sensory test was designed based on 9-point Hedonic tests to evaluate how much the sample was liked comparing to reference milk[7]. The odor and flavor were analyzed separately. A total of 8 panelists were included in this test. The milk powder was reconstituted in water first (12% solid content) before being served. Freezer stored negative control was used as the reference milk. The sensory panelists were asked to compare each treated/untreated milk (blinded coded with 3 random digits) with the reference milk to determine whether the test sample tasted or smelled better or worse. The score of the reference milk was set to be 0.

The First Screening of Ingredients in Liquid Whole Fat Milk.

A model system was developed using liquid whole fat milk to screen a large number of treatments for the identification of ingredients which are effective in delaying milk fat oxidation. Primary oxidation (PV) and secondary oxidation products (TBARs) of the milk samples were monitored as they were proved in previous literatures to be good parameters to monitor the progress of milk fat oxidation[5, 8-11] In this procedure, the milk was warmed up to room temperature, and immediately treated with the ingredients or their combinations. Each milk sample (~20 g) was stored in a glass vial (30 mL, Fisher Scientific, Cat#02-911-463) and placed under light bulbs (mimicking natural light) at 4° C. PV at Day 0, Day 1, Day 4 and Day 7 of storage were measured and TBARs were monitored at Day 0, Day 4 and Day 7. The details of the test methods were described in the previous subsection.

In the first screening, a total of 29 treatments and 1 untreated negative control were included. The goal for the first screening was to identify best combinations of ingredients to delay the milk fat oxidation. Table 1 has listed the treatments and the dosages of individual ingredients. The ingredients included spearmint extract with rosmarinic acid as the active compound, propyl gallate, rosemary extract (ROSAN) with carnosic acid/carnosol as major active compounds, pure rosmarinic acid, ascorbyl palmitate and citric acid. SRPT in Table 1 is an experimental formula which combines spearmint extract (20%), ROSAN (22.5%), mixed tocopherols (MT95, 20%) and ascorbyl palmitate (1%) in inert carriers (propylene glycol and Tween 80)[12]. The dosage used in this screening had equal amount of spearmint extract as in other treatments which contained spearmint extract. This batch of spearmint used in the screening contained 13.4% rosmarinic acid. The treatment which contained spearmint extract had about 2.7 ppm rosmarinic acid, which was close to the amount of rosmarinic acid in sample NO.A8 (Table 1), which was designed to evaluate the efficacy of rosmarinic acid in delaying milk fat oxidation without including other components as confounding factors.

TABLE 1

Ingredients and dosages in each treatment in liquid whole fat milk in the first screening.

| Sample NO. | SE (ppm) | PG (ppm) | ROSAN (ppm) | MT95 (ppm) | RA (ppm) | SRPT | AP10 (10% AP) | CA |
|---|---|---|---|---|---|---|---|---|
| A1  | 20 |    |    |    |    |     |    |    |
| A2  |    | 50 |    |    |    |     |    |    |
| A3  | 20 | 50 |    |    |    |     |    |    |
| A4  |    | 20 | 50 |    |    |     |    |    |
| A5  | 20 | 20 | 50 |    |    |     |    |    |
| A6  |    |    |    | 50 |    |     |    |    |
| A7  | 20 |    |    | 50 |    |     |    |    |
| A8  |    |    |    |    | 3  |     |    |    |
| A9  |    |    |    |    |    | 100 |    |    |
| A10 |    |    | 50 | 50 |    |     | 10 |    |
| A11 | 20 |    | 50 | 50 |    |     | 10 |    |
| A12 |    |    |    |    |    |     | 10 |    |
| A13 | 20 |    |    |    |    |     | 10 |    |
| A14 |    |    |    |    |    |     |    | 20 |
| A15 | 20 |    |    |    |    |     |    | 20 |
| A16 |    | 20 | 50 |    |    |     |    |    |
| A17 | 20 | 20 | 50 |    |    |     |    |    |
| A18 |    | 20 |    |    |    |     |    |    |
| A19 | 20 | 20 |    |    |    |     |    |    |
| A20 |    |    |    |    |    |     | 10 | 20 |
| A21 | 20 |    |    |    |    |     | 10 | 20 |
| A22 |    | 20 |    |    |    |     |    | 20 |
| A23 | 20 | 20 |    |    |    |     |    | 20 |
| A24 |    | 20 |    |    |    |     | 10 |    |
| A25 | 20 | 20 |    |    |    |     | 10 |    |
| A26 |    |    |    | 50 |    |     | 10 |    |
| A27 | 20 |    |    | 50 |    |     | 10 |    |
| A28 |    |    | 50 |    |    |     | 10 |    |
| A29 | 20 |    | 50 |    |    |     | 10 |    |
| A30 |    |    |    |    |    |     |    |    |

SRPT is a combination of SE, RE, AP and MT95.

Evaluation of Selective Ingredient Combinations in Spray Dried Whole Fat Milk Powder.

Three ingredient combinations from the first screening were selected (sample NO. A9, A11 and A17) to be evaluated in delaying milk fat oxidation in milk powder with untreated negative control and mixed tocopherols as positive control. The treatment and dosages were summarized in Table 2. Sample NO. A9 (SE+MT+RE+AP) and A17 (SE+MT+PG) represented the top performing treatment in the first screening. Sample NO.A11 (SE+RE) represented treatment with only natural plant extracts and from the data, this treatment was also effective in delaying milk oxidation. For sample NO.A9, which was the best performing treatment, two dosages were evaluated. Run #2 represented the dosages of ingredients in sample NO.A9 in the first screening (Table 1). In Run #3, the level of every ingredient was five-fold more than in Run #2. The purpose was to evaluate whether there would be a dose response relationship and whether milk powder from Run #3 could be used as the base to build popular dairy beverages in East Asia, which would have an inclusion rate of 20% milk powder in the beverage. The spray drying was performed at the University of Nebraska-Lincoln Food Science and Technology Department Food Processing Center's pilot lab. The spray dryer is a custom designed pilot plant tower spray dryer (Model T-20, Henningsen Foods, Inc., Omaha, Nebr.). The furnace temperature was 580° F. The outlet temperature was 193-208° F. The air pressure was set to be 25 PSIG. For each run, individual ingredients were added to 5.000 kg of whole fat milk and the milk was blended for 5 min by a hand-held blender to dissolve the components, before the spray drying. A few steps were taken to avoid cross contamination among different runs. First, during spray drying, the milk powder produced from the first 5 min was discarded. Second, after each run, the inside of the machine was cleaned by manual brushing. Third, only the milk powder that passed the cyclone to the sample collection bottle was collected. The milk powder that was in the spray chamber, the bottom of the spray tower and in the cyclone was discarded. For each run, about 300-350 g milk powder could be generated. However, for untreated negative control (Run #1), 10.00 kg milk was spray dried in order to have enough materials as control for the sensory test.

TABLE 2

Treatment and Dosages of individual ingredients in spray dried milk powder.

| Run # | SE (ppm) | ROSAN (ppm) | MT95 (ppm) | PG (ppm) | AP (ppm) |
|---|---|---|---|---|---|
| 1 | 0.0   | 0.0   | 0.0   | 0.0  | 0.0 |
| 2 | 20.0  | 22.5  | 20.0  | 0.0  | 1.0 |
| 3 | 100.0 | 112.5 | 100.0 | 0.0  | 5.0 |
| 4 | 25.0  | 0.0   | 50.0  | 10.0 | 0.0 |
| 5 | 25.0  | 25.0  | 50.0  | 0.0  | 0.0 |
| 6 | 0.0   | 0.0   | 100.0 | 0.0  | 0.0 |

One day after the spray dry trial, an informal sensory test was conducted to determine whether any of the treatment would have impact on the flavor of the milk. On the same day, the milk powder from each run was split into four portions and stored at four different conditions. The first portion was sealed in a food grade polypropylene plastic bag first. The bag was then sealed in an aluminum foil bag to avoid light exposure. This portion was then stored in −20° C. freezer to minimize any oxidation. The second and third portion were stored in opaque plastic bottles (Qorpak, Cat# PLC-07907) and stored in 40° C. incubator (heated storage) or in the lab cabinet (ambient storage), separately. The fourth portion was stored in clear 30 mL glass bottles and was put in light box (light storage). PV and TBARs were monitored for each individual storage condition. To measure PV and TBARs, the milk powder was reconstituted in water to form liquid milk (12% solid content) first. Then PV and TBARs were measured the same way as they were tested in the liquid milk screening. The test frequency for the two accelerated storage conditions was once per 5-14 days. The test frequency for ambient storage condition was once per month. For ambient storage condition, sensory test was also conducted using the same method as in the sensory test for freshly spray dried milk powder.

The Second Screening of Ingredients in Liquid Whole Fat Milk.

A second screening was performed using the same milk model system. The first goal of this screening was to identify the contribution of individual ingredients in the best performing ingredient combinations that were discovered from the first screening. The second goal was to compare the performance of the best performing ingredients or ingredient combinations to synthetic antioxidant BHA, which is allowed to be used in whole fat milk powder. The third goal is to evaluate two additional formulas. An internal group has recently developed an experimental FORTRA™ 103 PG Liquid which is a standardized spearmint extract in propylene glycol (RA=4.0-4.5%)[4]. FORTRA 103 PG liquid was evaluated to see whether it has the same antioxidant activities compared to dry spearmint extract. RA contents in Sample NO. B3-B5 were comparable to RA contents in Sample NO. B6-B8. Verdilox GT Liquid contains mixed tocopherols, ROSAN SF35 and lipid soluble green tea as active ingredients. This formula was evaluated to see whether the combination of the three components at this ratio could be effectively used to delay milk fat oxidation. The storage conditions and tests on PV and TBARs were the same as in the first screening.

TABLE 3

Ingredients and dosages (ppm) used in the second screening in liquid whole fat milk.

| Sample NO. | SE | ROSAN | PG | MT95 | AP | FORTRA | Verdilox | BHA |
|---|---|---|---|---|---|---|---|---|
| B1 | | | | | | | 200.0 | |
| B2 | | | | | | | 400.0 | |
| B3 | 10.0 | | | | | | | |
| B4 | 25.0 | | | | | | | |
| B5 | 50.0 | | | | | | | |
| B6 | | | | | | 30.0 | | |
| B7 | | | | | | 75.0 | | |
| B8 | | | | | | 150.0 | | |
| B9 | 25.0 | 25.0 | | 50.0 | 2.0 | | | |
| B10 | | | | | 1.0 | | | |
| B11 | 25.0 | 10.0 | | 50.0 | 2.0 | | | |
| B12 | 25.0 | 25.0 | | 20.0 | 2.0 | | | |
| B13 | 10.0 | 10.0 | | 20.0 | 2.0 | | | |
| B14 | | 25.0 | | 50.0 | 2.0 | 75.0 | | |
| B15 | | 10.0 | | 20.0 | 2.0 | 30.0 | | |
| B16 | 25.0 | 25.0 | | 50.0 | | | | |
| B17 | 25.0 | 10.0 | | 50.0 | | | | |
| B18 | 25.0 | 25.0 | | 20.0 | | | | |
| B19 | 10.0 | 10.0 | | 20.0 | | | | |
| B20 | | 25.0 | | 50.0 | | 75.0 | | |
| B21 | | 10.0 | | 20.0 | | 30.0 | | |
| B22 | 25.0 | | 8.0 | 50.0 | | | | |
| B23 | 25.0 | | 4.0 | 50.0 | | | | |
| B24 | 25.0 | | 8.0 | 20.0 | | | | |
| B25 | 10.0 | | 4.0 | 20.0 | | | | |
| B26 | | | 8.0 | 50.0 | | 75.0 | | |
| B27 | | | 4.0 | 20.0 | | 30.0 | | |
| B28 | | | | | | | | 3.3 |
| B29 | | | | | | | | 6.5 |
| B30 | | | | | | | | 8.3 |
| B31 | | | | | 50.0 | | | |
| B32 | | | | | 20.0 | | | |
| B33 | 25.0 | 25.0 | | 50.0 | 3.0 | | | |
| B34 | 25.0 | 25.0 | | 50.0 | 6.5 | | | |
| B35 | 25.0 | 10.0 | | 25.0 | 15.0 | | | |
| B36 | | | | | | | | |

Results

First Screening in Liquid Milk.

Figure 2:
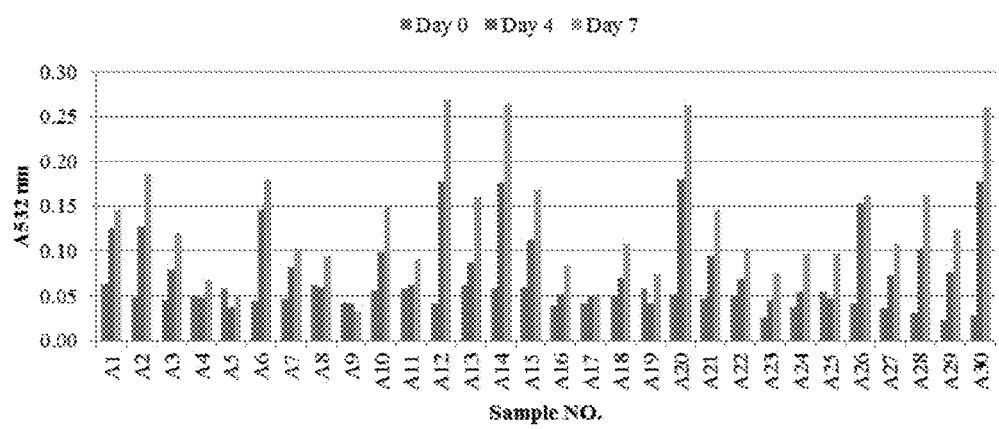
FIG. 2 is a chart of TBARs values in liquid whole fat milk; the sample # corresponds to the number in Table 1.
Figure 3:
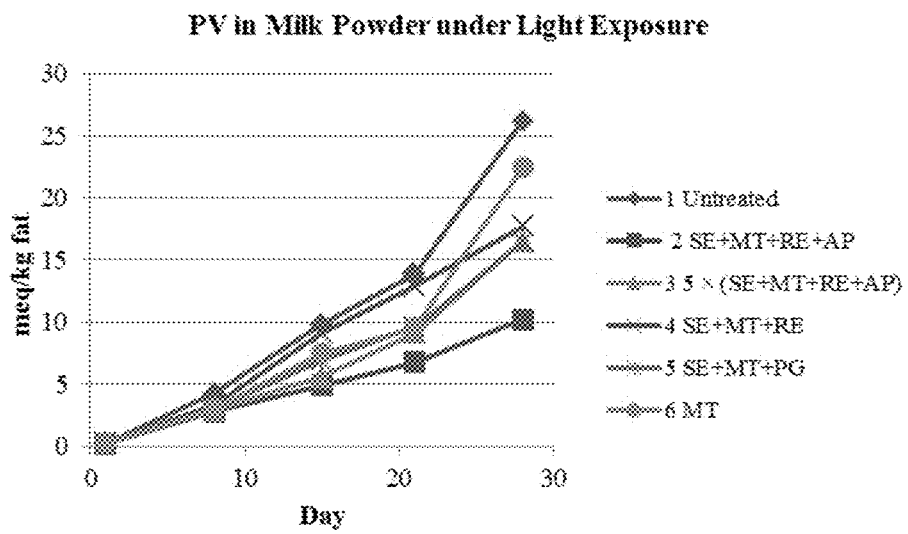
FIG. 3 is a chart of the primary oxidation of spray-dried milk powder under light exposure wherein SE=spearmint extract, MT=FORTIUM® MT95, RE=ROSAN SF35, AP=ascorbyl palmitate, and PG=propyl gallate.
Figure 4:
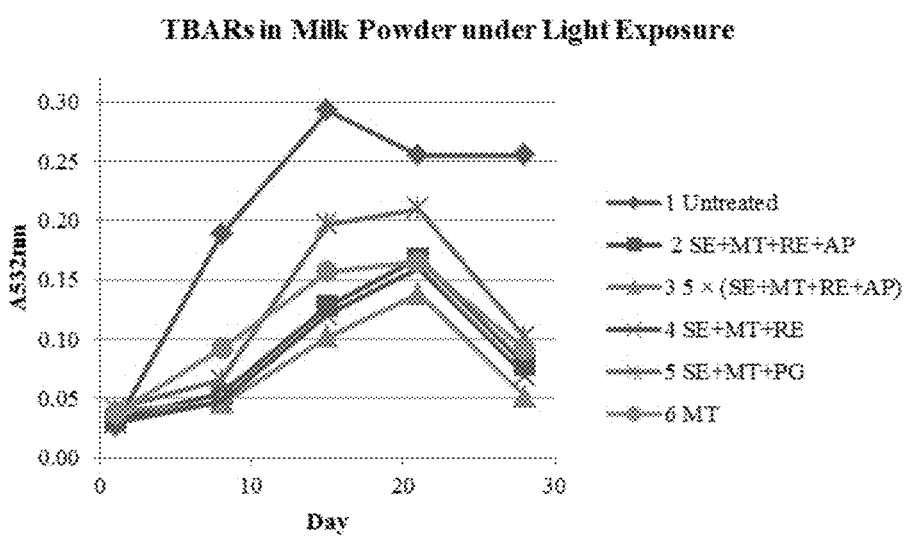
FIG. 4 is a chart of TBARs values of spray-dried milk powder under light exposure wherein SE=spearmint extract, MT=FORTIUM MT95, RE=ROSAN SF35, AP=ascorbyl palmitate, and PG=propyl gallate.
Figure 5:
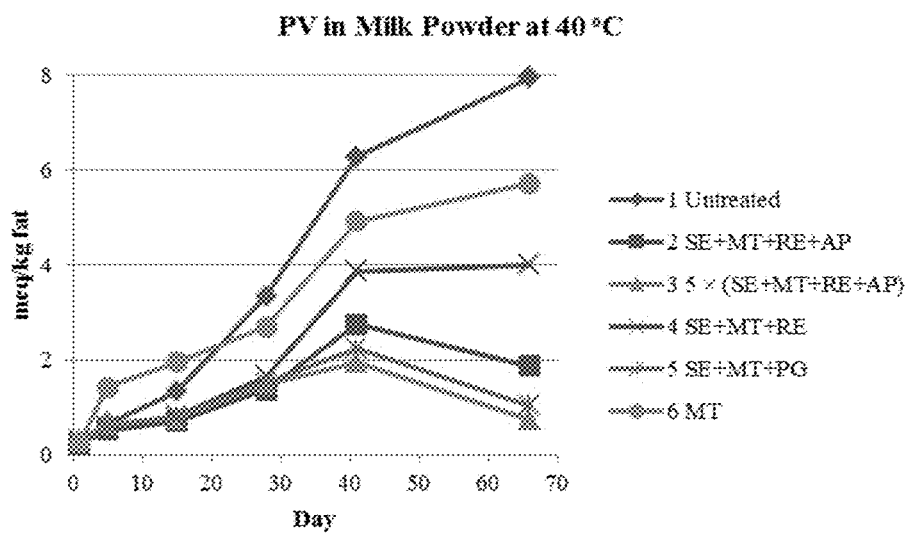
FIG. 5 is a chart of the primary oxidation of spray-dried milk powder under 40° C. storage conditions without light exposure, wherein SE=spearmint extract, MT=FORTIUM MT95, RE=ROSAN SF35, AP=ascorbyl palmitate, and PG=propyl gallate.
Figure 6:
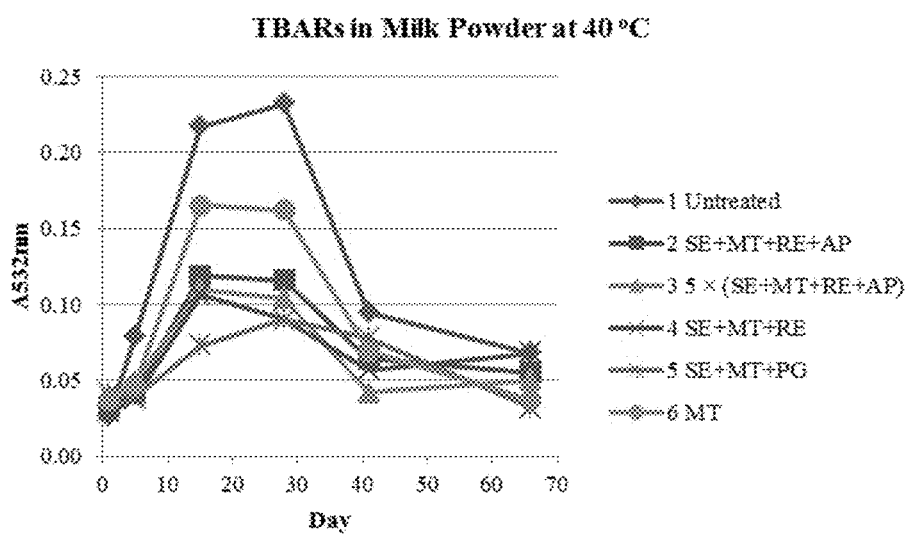
FIG. 6 is a chart of TBARs values of spray-dried milk powder under 40° C. storage conditions without light exposure, wherein SE=spearmint extract, MT=FORTIUM MT95, RE=ROSAN SF35, AP=ascorbyl palmitate, and PG=propyl gallate.
Figure 7:
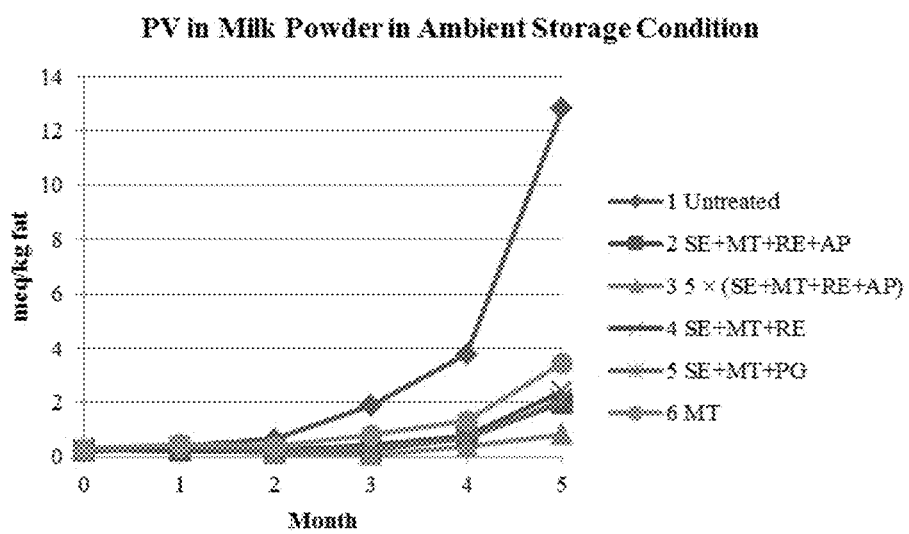
FIG. 7 is a chart of the primary oxidation of spray-dried milk powder ambient storage conditions wherein SE=spearmint extract, MT=FORTIUM MT95, RE=ROSAN SF35, AP=ascorbyl palmitate, and PG=propyl gallate.
Figure 8:
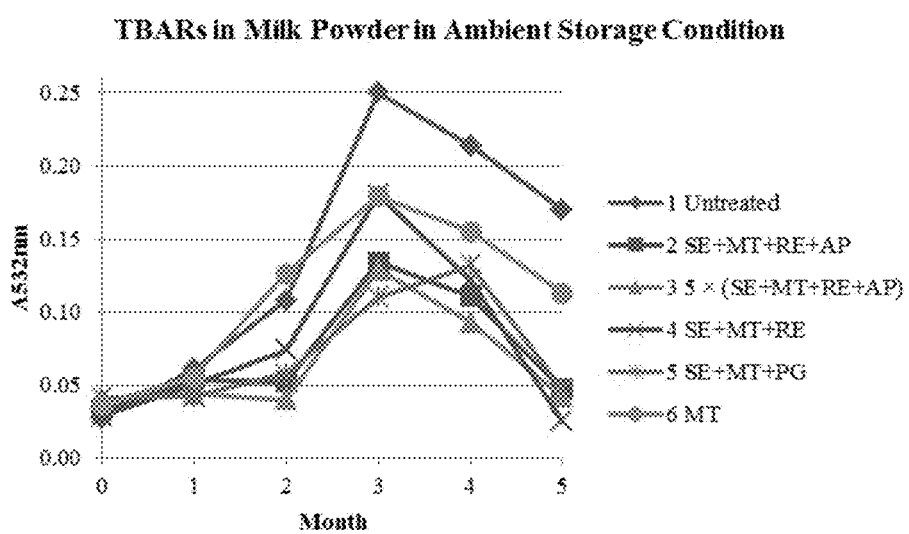
FIG. 8 is a chart of TBARs values of spray-dried milk powder under ambient storage conditions, wherein SE=spearmint extract, MT=FORTIUM MT95, RE=ROSAN SF35, AP=ascorbyl palmitate, and PG=propyl gallate.

The PV and TBARs values of the liquid milk during storage were plotted in FIG. 1 and FIG. 2, separately.

Spray Dried Milk Powder.

The PV and TBARs of light stored, heat stored and ambient stored are summarized in FIGS. 3-4, 5-6 and 7-8, separately. The sensory test results for ambient stored samples were summarized in FIGS. 9-10, 13 and 14.

Second Screening of Ingredients in Liquid Whole Fat Milk.

Figure 11:
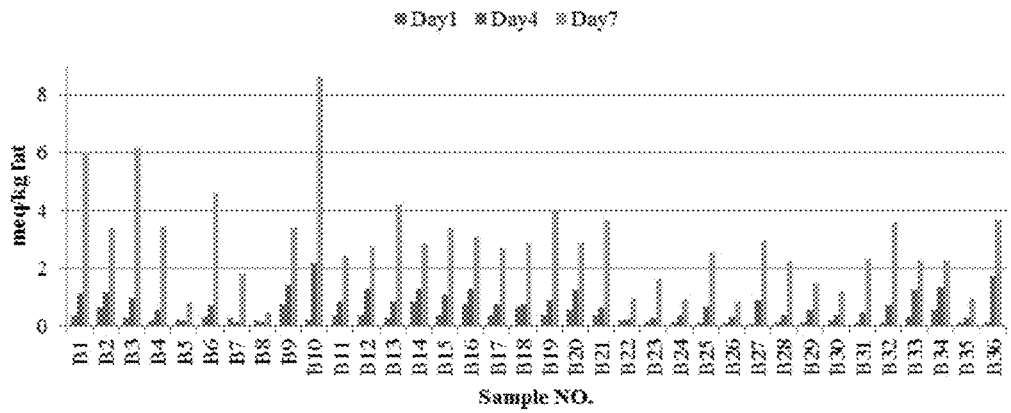
FIG. 11 is a chart of peroxide values in liquid whole fat milk in a second screening; the sample # corresponds to the number in Table 3.
Figure 12:
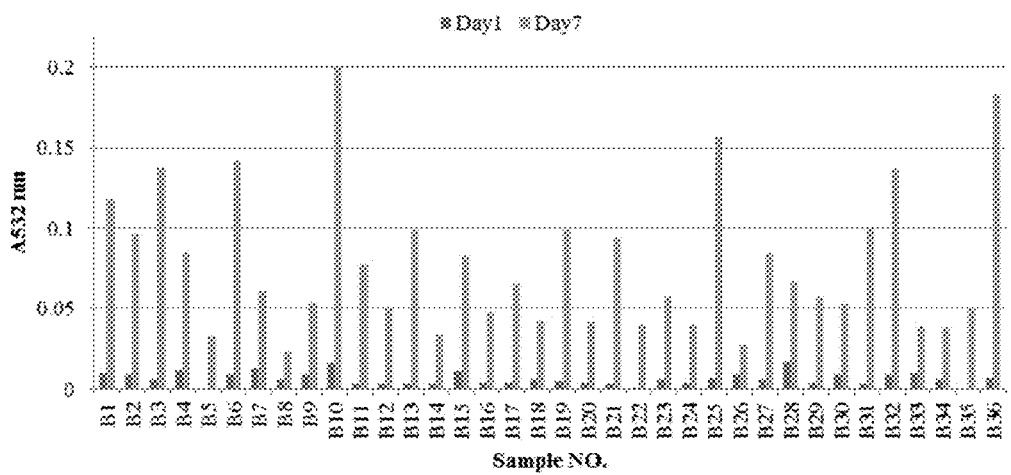
FIG. 12 is a chart of TBARs values in liquid whole fat milk in a second screening; the sample # corresponds to the number in Table 3.
Figure 13:
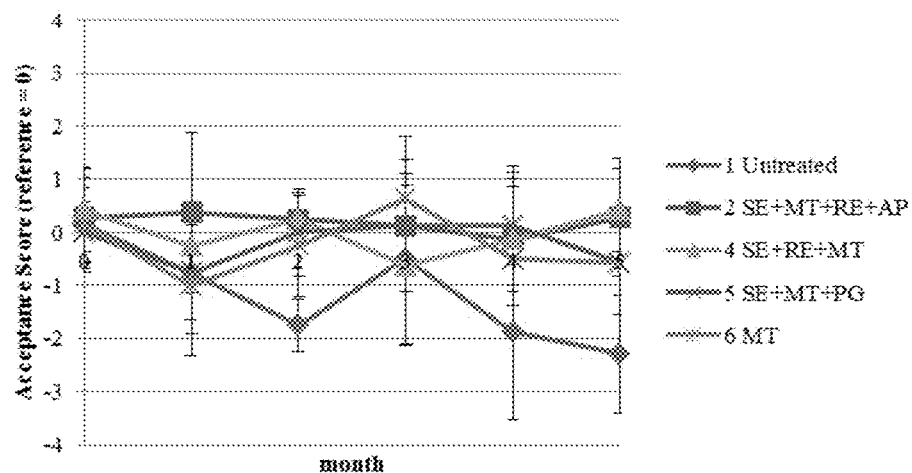
FIG. 13 is a chart of the sensory evaluation of the odor acceptance of reconstituted whole fat milk from spray-dried milk powder stored at ambient conditions; error bars represent the standard deviation of scores from eight panelists.
Figure 14:
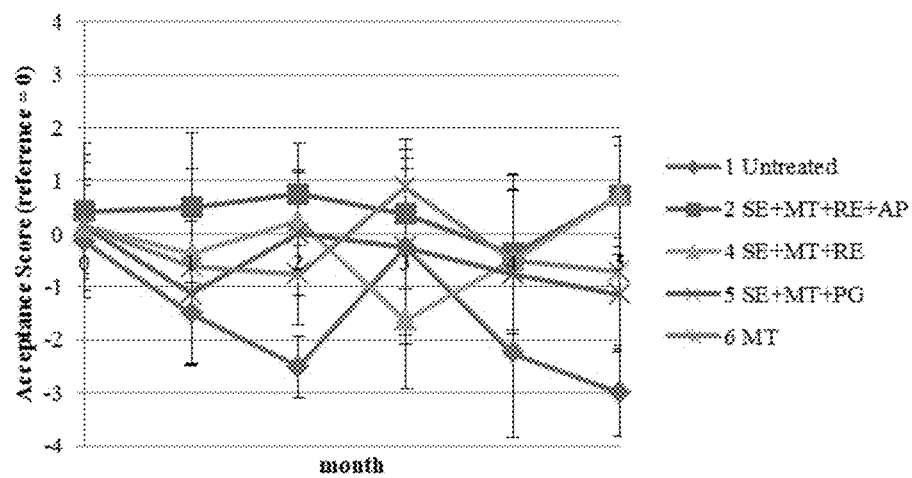
FIG. 14 is a chart of the sensory evaluation of the taste acceptance of reconstituted whole fat milk from spray-dried milk powder stored at ambient conditions; error bars represent the standard deviation of scores from eight panelists.

The PV and TBARs of the liquid milk were summarized in FIG. 11 and FIG. 12, separately.

Discussion

First Screening.

The primary goal of this study is to identify ingredients which could be used to effectively delay oxidation in whole fat milk powder. Most of the time, milk powder is obtained by spray dry of liquid milk. So far, the antioxidant that is allowed to be added to whole fat milk powder is BHA. However, natural and more effective ingredients are becoming desirable for both consumer preference and human health considerations. In order to identify effective treatments, trials have to be taken to evaluate multiple ingredients and multiple dosages. Spray drying is resource intensive and it is unlikely to be used as part of the screening tools for large amount of treatments. So a model system was designed in liquid whole fat milk that allowed us to screen many treatments and dosages in a short period of time. Whole fat milk is enriched many vitamins including riboflavin (Vitamin B2). Riboflavin is a well-known photosensitizer that would be activated under light exposure. Photosensitized oxidation reactions happen during the milk storage, and are the major reasons for rapidly increased peroxide values and TBARs values in untreated milk sample[14] (sample NO.A30 in FIG. 1-2). The treatments which contain antioxidant activities generally decreased the accumulation of both of the oxidation products. The mode of actions for different antioxidants is considered to be different. For example, spearmint extract with rosmarinic acid as active compound, rosemary extract with carnosic acid/carnosol as active compounds, mixed tocopherols and propyl gallate are considered to be free radical scavengers which prevent the free radical chain reactions. Chemicals like citric acid are metal ion chelators which sequester metal ions that can act as catalyst in oxidation reactions. Reducing agents including ascorbyl palmitate could react with reactive oxygen species, thus removing the oxidation reagents that would oxidize lipid molecules. Previous reports have shown that BHA, AP, CA and gallate were effective in delaying spray dried milk powders[13-15]. In this study they were included in the screening. In this screening, a total of 29 ingredients or ingredient combinations were applied to liquid whole fat milk. The primary and secondary oxidation products were monitored over 7 days of storage time. All of the ingredients could delay the accumulation of primary and secondary oxidation products to different levels in the milk compared to the untreated sample (FIG. 1-2). Spearmint extract in combination with another ingredient in all the cases further lowered the amount of oxidation products. Rosmarinic acid by itself proved to be very effective in preventing milk fat oxidation (sample NO.A8). The efficacy of pure rosmarinic acid was almost the same as the best performing treatment, sample NO.A9, which indicated that rosmarinic acid is an effective compound to slow down light induced oxidation. Second, although propyl gallate containing milk samples had low PV and TBARs value, at this dosage, after 4 days, the milk samples turned to a yellow color, which would not be desirable for consumer preference. The yellow color was likely from the degradation products of propyl gallate, which has also been observed in many other matrices which contain propyl gallate.

Spray dried milk powder. Based on the results from the first screening, sample NO.A9 (SE+MT+RE+AP), sample NO.A11 (SE+MT+RE) and NO.A17 (SE+MT+PG) were selected for further evaluations in spray dried milk powder. Mixed tocopherols were chosen as the positive control because it is a popular naturally derived ingredient in dairy beverages. This dosage (100 ppm) is common in many types of dairy beverages. As was discussed earlier, sample NO.A11 contained spearmint extract and rosemary extract, and was fairly effective in delaying accumulations of oxidation products. The ingredients were both natural plant extracts, making it beneficial to evaluate this combination in spray dried milk powder.

It is common knowledge that photosensitizer induced oxidation and autooxidation of lipid molecules could assume different paths. The liquid milk model was suitable for evaluation of ingredients in slowing down photosensitizer induced oxidation, which would be orders of magnitude faster than autooxidation, especially at refrigerated storage condition[16-17]. However, this model is not suitable to evaluate autooxidation. Autooxidation in the refrigerated condition would be very slow. If the milk was to be stored in the dark, it would be spoiled before it is oxidized. However, in spray dried milk powder, the water activity is low enough that microbial growth would not be likely to happen before it is oxidized by either light induced oxidation or autooxidation. In this study, the oxidation of milk powder was accelerated either under light, or under heated conditions. From FIG. 3-4, it was apparent that untreated milk powder was oxidized relatively faster in light storage conditions. Second, because of different oxidation paths, the treatments were different in their efficacies to protect milk fat from oxidation. For example, mixed tocopherols seemed to be better to protect milk from light induced oxidation. Other treatments had better performance than mixed tocopherols alone in heat induced autooxidation. Third, in light storage condition, for the same types of ingredients, higher dosages (Run #3, 5 fold of the dosages than Run #2, SE+MT+RE+AP) was not better than lower dosages (Run #2) in slowing down oxidation. However, in heat induced oxidation, the dose response was apparent, that higher dosage had better protection capabilities. It is possible that in Run #3, the higher oxidation rate could be attributed partially to the chlorophyll that is known to be present in the rosemary extract because both chlorophyll and riboflavin are photosensitizers. Finally it was interesting to see that TBARs value would increase first then decrease. TBARs measure malondialdehyde, which is generated from lipid oxidation. However, malondialdehyde is just one of the many lipid oxidation products and it is not an end product. It is likely that malondialdehyde decomposed during the storage period to form more advanced oxidation product(s). Nevertheless, it is an indication of lipid oxidation and is still useful to compare different treatments during storage of the milk powder as the values showed good data separations and the relative ranking of treatment matched the relative rankings from PV measurements.

Figure 9:
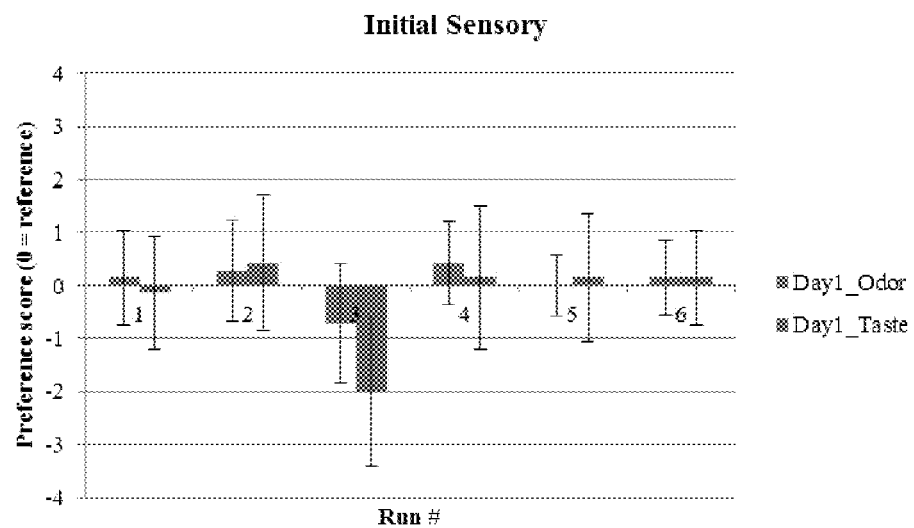
FIG. 9 is a chart of the sensory evaluation of reconstituted whole fat milk from freshly spray-dried milk powder; error bars represent standard deviation of scores from 8 panelists. The sample numbers correspond to the run numbers in Table 2.
Figure 10:
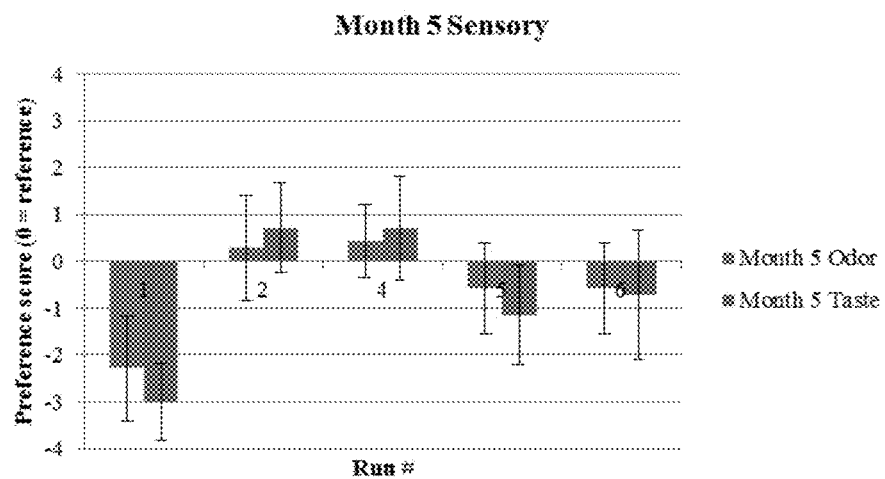
FIG. 10 is a chart of the sensory evaluation of reconstituted whole fat milk from spray-dried milk powder after 5 months of storage under ambient conditions; error bars represent standard deviation of scores from 8 panelists. The sample numbers correspond to the run numbers in Table 2.

In ambient storage condition which mimicked the open shelf storage condition in a store for milk powder, the oxidation was much slower. However, the untreated milk powder still developed considerable oxidation products by month 4 (FIG. 5-6), which indicated that whole fat milk powder needs ingredients and/or special packaging to maintain its quality and shelf life. Tocopherols lowered the oxidation products but was less effective than all the treatments with ingredient combinations. By month 5, the higher dosage treatment, Run #3 (5×SE+MT+RE+AP) were not observed to generate significant oxidation products, but the dosages in Run #3 were so high that the ingredients impacted the flavor of the reconstituted milk (FIG. 9). However, as was stated earlier, milk powder produced from Run #3 was intended to be used as the ingredient in dairy beverages which had common inclusion rate of 20% milk powder, so the final dosages of ingredients in the beverage would be the same as in the reconstituted milk from Run #2 (SE+MT+RE+AP). From the sensory evaluation (FIG. 9), the dosages in Run #2 did not impart flavor problems in the reconstituted milk so it is likely that the higher dosages would be accepted by beverage manufactures because of the very good performance of this treatment and because the sensory evaluation would not be affected at the low inclusion rate of the milk powder. Because of the sensory impact from the high levels of ingredients, the sensory evaluation over storage time did not include samples from Run #3 (5×SE+MT+RE+AP). When all the other treatments were compared, all the spearmint extract-containing treatments had similar PV and TBARs values, and they were much better than the untreated and mixed tocopherols treated samples. For sensory evaluation, although the error bars were all very big, it was consistent that Run #2 (SE+MT+RE+AP) was preferred over the other treatments numerically (FIGS. 9, 10, 13 and 14). Run #2 contained the treatment which was the best performing treatment in the first screening in liquid milk (sample NO.A9 in Table 1). It included many components including spearmint extract, rosemary extract, mixed tocopherols and ascorbyl palmitate. It is possible that those ingredients acted differently because of their different antioxidant mechanisms and their different solubilities.

Second Screening in Liquid Milk Model.

After the first screening and spray dry trials, there was a better understanding on the oxidation patterns of whole fat milk powder. However, there were a few pending questions that need further testing. First, it is apparent that pure rosmarinic acid and spearmint extract were very effective in delaying milk oxidation. Further tests are needed to understand whether spearmint extract be used as the only ingredient and still has desirable efficacy at a suitable dosage. Second, synthetic antioxidant, BHA, is allowed to be added to whole fat milk powder. It is important to compare the relative efficacy of the best performing treatments to BHA. Third, in the first screening, the dosages of individual ingredients were fixed. The next screening should vary the dosage of the ingredient of interest, while fixing the dosages of other ingredients in the best performing treatments. Fourth, it is instructive to compare the efficacy of liquid spearmint extracts with dry spearmint extracts.

To answer those questions, a second screening in liquid whole fat milk was designed and performed. A total of 35 treatments were applied plus the untreated control. From FIGS. 11 and 12, a few observations were made. First, spearmint extract alone showed a nice dose response (sample NO. B3-B6) and the highest dosage was one of the best performing treatments among all the treatments. From prior work, it is known that this dosage would not have sensory impact. Second, the liquid spearmint formula had slightly better performance than the dry formula when rosmarinic acid content from spearmint was the same (sample NO.B7-B9). Both of the highest dosages had less oxidation products than all the samples treated with BHA (sample NO. B28-B30). Sample NO. B29 and sample NO. B30 contained the levels that were the maximum allowed dosages for EU and US, separately. So spearmint extract alone at suitable dosages (lower than sensory threshold) were seen be more effective than BHA. Another observation is that for all the treatments that contained the same types of ingredients, the treatment with lower dosage of spearmint extract would have a profound negative effect in preventing milk oxidation. (e.g. sample NO. B11-B12 vs NO.B13, B16-B18 vs. NO.B19, FIG. 11-12). This effect was not as big for other ingredients. This indicated that spearmint extract made major contributions in delaying milk oxidation.

In conclusion, a liquid milk model was established especially in looking for ingredients in delaying light induced oxidation of lipid molecules. From the screenings and subsequent study in spray dried milk powder, spearmint extract was identified as the most effective ingredient by itself or in combinations with other ingredients, and it is likely to compete with BHA, the synthetic antioxidant that is used in whole fat milk powder.

Example 2

Methods and Methods

Materials and Reagents.

Whole fat milk (Hiland Vitamin D Milk, 3.25% fat content) was purchased from local grocery store. ROSAN SF35 LC (M017226, Lot #20140527-1), FORTIUM® MT95 (RM 15515, Lot #1307109107), FORTRA 101 Dry (FORTRA Dry, Item 016961, Lot #1301105943), Ascorbyl palmitate (AP, RM16700, Lot #AAS012G004), Butylated hydroxyanisole (BHA, RM01013, Lot #B1311000063C) were used in this study.

Evaluation of Ingredients in Spray Dried Whole Fat Milk Powder.

This study is a follow-up of the previous Example 1 focusing on ingredients to stabilize milk fat in spray dried milk powder. A total of 7 treatments plus an untreated negative control were included. The treatments are summarized in Table 4. One treatment from the Example 1 powder study was selected (Run #6) to validate its performance in this study. FORTRA Dry by itself was evaluated at two dosages (Run #3 and 4). BHA at 50 ppm (based on total fat content, Run #5) was chosen as one of the positive controls. The ingredients from Run #8 represented a common treatment in baby formula, as the other positive control. The spray dry was performed at the University of Nebraska-Lincoln Food Science and Technology Department Food Processing Center's pilot lab. The spray dry is a custom designed Pilot plant tower spray dryer (Model T-20, Henningsen Foods, Inc., Omaha, Nebr.). The furnace temperature was 580° F. The outlet temperature was 193-208° F. The air pressure was set to be 25 PSIG. For each run, individual ingredients were added to 5.000 kg of whole fat milk and the milk was blended for 5 min by a hand-held blender to dissolve the components, before the spray dry. A few steps were taken to avoid cross contamination among different runs. First, during spray dry, the milk powder produced from the first 5 min was disposed. Second, after each run, the inside of the machine was cleaned by manual brushing. Third, only the milk powder that passed the cyclone to the sample collection bottle was collected. The milk powder that was in the spray chamber, the bottom of the spray tower and in the cyclone was disposed. For each run, about 300-350 g milk powder could be generated. However, for untreated negative control (Run #1), 10.000 kg milk was spray dried in order to have enough materials that part of it can be used to be stored in nitrogen atmosphere (Run #2).

TABLE 4

Treatment and Dosages of individual ingredients in spray dried milk powder.

| Run # | FORTRA Dry (ppm) | ROSAN (ppm) | MT95 (ppm) | AP (ppm) | BHA (ppm) | Nitrogen Package |
|---|---|---|---|---|---|---|
| 1 | 0.0 | 0.0 | 0.0 | 0.0 | 0.0 | No |
| 2 | 0.0 | 0.0 | 0.0 | 0.0 | 0.0 | Yes |
| 3 | 100.0 | 0.0 | 0.0 | 0.0 | 0.0 | No |
| 4 | 150.0 | 0.0 | 0.0 | 0.0 | 0.0 | No |
| 5 | 0.0 | 0.0 | 0.0 | 0.0 | 50.0 | No |
| 6 | 50.0 | 22.5 | 20.0 | 1.0 | 0.0 | No |
| 7 | 100.0 | 50.0 | 0.0 | 0.0 | 0.0 | No |
| 8 | 0.0 | 0.0 | 100.0 | 10.0 | 0.0 | No |

FORTRA Dry = FORTRA ™ 101 Dry. ROSAN = ROSAN SF35 LC, MT95 = FORTIUM ™ MT95, AP = Ascorbyl palmitate. BHA was dosed based on the total fat weight, while all other treatments were dosed based on total whole fat milk weight.

The milk powder from each run was stored in PET bags for storage. The storage condition is ambient (22-24° C.) without light exposure. For Run #2, 100 g untreated milk powder was divided into 8 equal portions into 8 separate PET bags. The open bags were transferred in a plastic glove bag (Sigma-Aldrich, Z530212-1EA). The bags were flushed inside the glove bag with house nitrogen for 30 min, before being sealed and put into individual aluminum bags and sealed again. At each test point, one bag was open and used for PV analysis, and compare to other treatments. To measure $PV^1$, the milk powder was reconstituted in water to form liquid milk (12% solid content) first. Next, in a 10 mL volumetric flask, 4 mL BDI solution (50 g sodium polyphosphate, 50 g urea, 24 mL Triton-X100 and 100 mL IPA. Add water to 1 L) and 6 mL reconstituted milk sample were mixed. The flask was immersed in a water bath at 80° C. for 20 min. A fat column developed on the top of the aqueous layer. The fat was used as the sample for PV determination following an established method.

Sensory Evaluation of Milk Powder.

The sensory test was designed based on 9-point Hedonic tests to evaluate how much the sample was liked comparing to reference milk[18]. The odor and flavor were analyzed separately. A total of 8 panelists were included in this test. The milk powder was reconstituted in water first (12% solid content) before being served. Freezer-stored negative control was used as the reference milk. The sensory panelists were asked to compare each treated/untreated milk (blinded coded with 3 random digits) with the reference milk to determine whether the test sample tasted or smelled better or worse. The score of the reference milk was set to be 0.

Results

PV Accumulation in Whole Fat Milk Powder.

Figure 15:
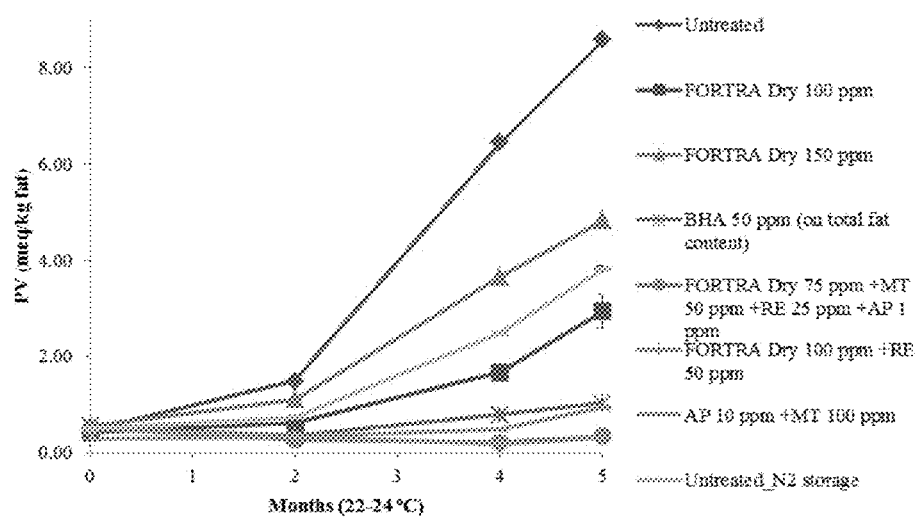
FIG. 15 is a chart of the PV change over storage time for whole fat milk powder. MT=FORTIUM MT95, RE=ROSAN SF35 LC, AP=ascorbyl palmitate. FORTRA Dry=FORTRA™ 101 Dry.

From FIG. 15, untreated whole fat milk powder underwent oxidation relatively fast comparing to all other treatments. By storing milk powder under an inert gas (nitrogen in this study), the speed of oxidation was slowed down. The common ingredients using in milk powder or milk powder product, BHA or the blend of mixed tocopherols and ascorbyl palmitate, showed different levels of improvement. The addition of FORTRA 101 Dry had improved the oxidative stability of milk powder. However, the dose response was not observed, that the lower dosage seemed to have lower PV than the higher dosage over time. So there is a possibility that if FORTRA 101 Dry is used alone at high dosage, there might be pro-oxidant activity that counters the antioxidant capabilities of this spearmint extract based product. When FORTRA 101 Dry was used in combination with other ingredients (Run #6 and #7 in Table 4), they showed the best improvement on the stabilization of milk powder over the untreated than other treatments in this study.

Sensory Evaluation of Milk Powder.

Figure 16:
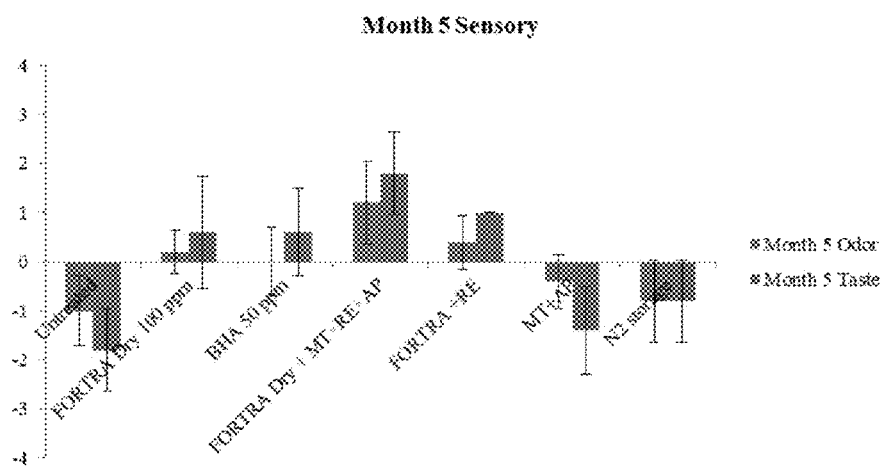
FIG. 16 is a chart of the sensory evaluation of the reconstituted milk after 5 months of storage; the error bars are the standard deviation of the scores of 8 panelists.

The sensory acceptance of the milk powder after 5 months of storage was evaluated and the result was illustrated in FIG. 16. Because this is an informal sensory study with a consumer panel (not a trained sensory panel), the error bars are relatively large. Numerically, untreated samples had lowest acceptance, which correlated with the highest amount of peroxides that were generated at this time point. Although MT+AP had relatively low peroxide values, sensory panelists commented that it had some added flavors that were not detected in any other samples. So it is possible that this treatment has resulted in off flavors that might be from a different mechanism from oxidation. The combination of FORTRA with mixed tocopherols, rosemary extract and ascorbyl palmitate had resulted in highest acceptance numerically. This combination also had lowest peroxides generated during storage. Other treatments have resulted in different levels of improvement in sensory attributes, comparing to the untreated negative control.

CONCLUSION

This follow-up study has confirmed the efficacy of spearmint extract based formula in delaying oxidation in milk powder. In the spray dried milk powder, the mechanism of different antioxidants might be different from liquid milk, that the mass transfer and effect from moisture would have different impact on the efficacy of ingredients. Spearmint extract by itself, when used at the right levels, has shown to have a large improvement over the untreated control to stabilize milk fat. The combinations of spearmint extract with other ingredients have shown to be even more powerful in delaying milk fat oxidation in milk powder.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

REFERENCE

1. US Dairy Export Council. (see usdec.org web site).
2. Huth, P. J., Influence of dairy product and milk fat consumption on cardiovascular disease risk: a review of the evidence. *Advances in Nutrition*, 3, 2012, 266-285.
3. Granda-Restrepo D., et. al, Release of antioxidants from co-extruded active packaging developed for whole milk powder. *International Dairy Journal* 19, 2009, 481-488.
4. Personal communication.
5. Mc Clunskey, S., et. al., Lipid and cholesterol oxidation in whole milk powder during processing and storage. *Journal of Food Science*, 62, 1997, 331-337.
6. Shantha, N. C. and Decker, E. A. Rapid, sensitive, Iron-based spectrophotometric methods for determination of peroxide values of food lipids. *Journal of AOAC International*, 77, 1994, 421.
7. Society of Sensory Professionals. (see website at sensorysociety.org/knowledge/sspwiki/Pages/The %209-point%20Hedonic%20Scale.aspx).
8. McCluskey, S. C. M., Cholesterol oxidation products in whole milk powder: analytical, nutritional, processing and toxicological studies, Ph.D. thesis, 1997, Dublin City University.
9. Cottone, E., Use of natural antioxidants in dairy and meat products: a review of sensory and instrumental analysis. B.S. thesis, 2006, California State Polytechnic University.
10. Hedegaard, R. V., et al., Comparison of description sensory analysis and chemical analysis for oxidative changes in milk. *Journal of Dairy Science*, 89, 2006, 495-504.
11. Smet, K., A change in antioxidative capacity as a measure of onset to oxidation in pasteurized milk. *International Dairy Journal*, 18, 2008, 520-530.
12. Personal communication.
13. Hoskin, J. C., Sensory analysis and riboflavin analysis of milk held in light-exposed one-gallon containers. M.S. thesis, 1979, The Pennsylvania State University.
14. Abbot, J., Ascorbyl palmitate as an antioxidant in full-cream milk powder. XVIII International Dairy Congress, Sydney, 1970, NO. 1E, 464.
15. Abbot, J. and Walte, R. The effect of antioxidants on the keeping quality of whole milk powder: I. Flavones, gallates, butylhydroxyanisole and nordihydrogualareric acid. *Journal of Dairy Research*, 29, 1962, 55-61.
16. Abbot, J. The effect of antioxidant on the keeping quality of spray-dried whole milk powder. International *Journal of Dairy Technology*, 24, 1971, 182-183.
17. Gunston, F. D. Chemical Properties. The lipid handbook. New York, Chapman and Hall, 1986, 449-484.
18. Society of Sensory Professionals. (see website at sensorysociety.org/knowledge/sspwiki/Pages/The%209-point%20Hedonic%20Scale.aspx).

We claim:

1. A method of protecting a dairy product from oxidation, comprising adding spearmint extract to the dairy product in an amount effective to protect the dairy product from light induced oxidation and auto-oxidation, wherein the spearmint extract is present in the dairy product in an amount that contains at least 1.3 mg/kg rosmarinic acid.

2. A method of protecting milk powder from oxidation, comprising adding rosmarinic acid to liquid milk in an amount effective to protect against light induced oxidation and auto-oxidation and drying the liquid milk and rosmarinic acid composition to create milk powder.

3. A method of extending the shelf life of milk powder, comprising adding rosmarinic acid to liquid milk in an amount effective to protect against light induced oxidation and auto-oxidation and drying the liquid milk and rosmarinic acid composition to create milk powder.

4. The method of claim 2 or 3, wherein rosmarinic acid is present in the milk powder in an amount of at least 1.3 mg/kg.

\* \* \* \* \*